Jan. 14, 1930.   C. C. EGBERT   1,743,197
IMPLEMENT FOR FILLING FARINACEOUS TUBULAR ROLLS
Filed Aug. 25, 1926   2 Sheets-Sheet 1

INVENTOR
Charles C. Egbert
BY
ATTORNEY

Jan. 14, 1930. C. C. EGBERT 1,743,197
IMPLEMENT FOR FILLING FARINACEOUS TUBULAR ROLLS
Filed Aug. 25, 1926 2 Sheets-Sheet 2

INVENTOR
Charles C. Egbert
By J. W. Ellis
ATTORNEY

Patented Jan. 14, 1930

1,743,197

UNITED STATES PATENT OFFICE

CHARLES C. EGBERT, OF NIAGARA FALLS, NEW YORK

IMPLEMENT FOR FILLING FARINACEOUS TUBULAR ROLLS

Application filed August 25, 1926. Serial No. 131,358.

My invention relates in general to implements for handling food products such as strips or rolls of meat and in particular to a device for filling tubular rolls of farinaceous material, such as those shown and described in United States Patent No. 1,589,850, with sausages commonly known as "weiners" or "hot dogs".

The principal object of my invention has been to provide an implement whereby a hot sausage may be easily and quickly picked from the utensil in which it is cooked and drawn into a tubular roll.

Another object has been to provide such a device whereby the sausage may be drawn into the tubular roll without splitting or mutilating the roll.

Furthermore, it has been an object to provide an implement by which a hot sausage may be placed in a tubular roll without touching the sausage with the hands, thus accomplishing the operation in a thoroughly sanitary manner.

Moreover, my implement may be used to manipulate and turn the sausage in the pan or other utensil while they are being cooked.

The above objects and advantages have been accomplished by the device shown in the accompanying drawings, of which:

Refering to the preferred form of my invention as shown in Figs. 1 to 3, 5 represents my implement and 6 is a farinaceous tubular roll which is shown in dotted lines. The roll is provided with the customary central hole 7.

Figure 3:
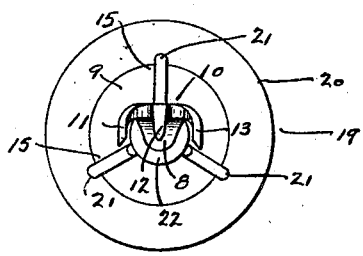
Fig. 3 is an end elevation of the implement.

My implement comprises a metallic rod 8 which is held at one end by a handle 9, preferably made of wood. The axis of the rod is preferably coincident with the axis of the handle. The outer end portion 10 of the rod 8 is bent slightly upwardly and is formed at its outer end preferably with three tines 11, 12, and 13. These tines are bent downwardly at any suitable angle with the rod 8 which will provide efficient hooks and each is provided with a sharpened point. As shown in Fig. 3, the central tine 12 is somewhat shorter than the outside tines 11 and 13, whereby the end of the rod may be more conveniently registered with the sausage which is to be hooked. The specific form and size of the hooked end portion 10 of the rod 8, with its tines are such that when the tines are pressed into a sausage near one end thereof the sausage will be held by the hook so that it can be lifted from the utensil in which it is cooked.

Figure 1:
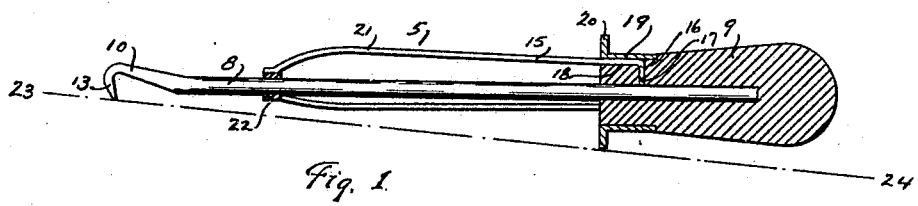
Fig. 1 is a side, sectional elevation of my complete implement.

A plurality of holding wires 15, preferably three in number, are provided on my implement. These wires preferably have their axes lying in planes which pass through the axis of the rod 8, and they are attached at their inner ends with the handle 9 in any suitable manner. As shown in the drawings, I prefer to provide each of the wires with an inwardly extending end 16, arranged at a right angle to the axis of the wire. The ends 16 are disposed in radial holes 17 provided in the handle and equidistantly spaced around its circumference. The portion of each wire adjacent the bent end is preferably disposed within a slot 18 formed in the handle. Obviously, the diameter of the holes 16 and width of the slots 18 is such that the holding wires will fit snugly therein and be held rigidly thereby. The diameter of that portion of the handle to which the holding wires 15 are attached is substantially the same as the size of the hole in the tubular roll, whereby the wires are held in such positions that they will substantially fit the hole in the roll. The handle is preferably provided with a ferrule 19 which not only holds the wires 15 securely in place, but prevents the splitting of the handle if made of wood. The ferrule 19 is provided with a laterally extending annular flange 20, which forms a hilt to limit the distance that the roll can be pushed onto the holding wires 15. The flange is of such a diameter that when the implement is placed upon the table or other supporting surface as represented in Fig. 1 by the line 23—24, the handle will be kept free of the supporting surface, thus making the handle easier to grasp and also keeping it from being soiled by grease or condiment which may be on the table.

The holding wires 15 are preferably bent outwardly a slight degree from the point where they are held in the handle 9 so that they will snugly engage the hole in the tubular roll. The outer end of each wire from a point 21 is bent inwardly toward the axis of the rod 8, and the extreme end of each of the wires is preferably secured to a ring 22. The ring 22 is slidably mounted upon the rod 8, so that it may have movement along the rod as the holding wires 15 are compressed for engagement with the hole of the tubular roll or when they are expanded as the roll is removed from the implement.

Figure 4:
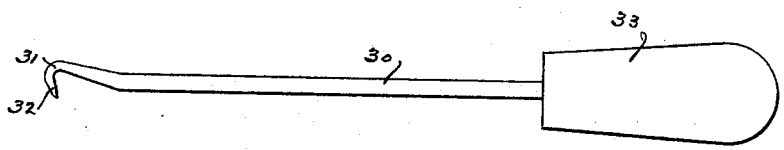
Fig. 4 is a side elevation of a simplified form of my invention.

In the simplified form of my invention, as shown in Fig. 4, I provide a rod 30 having a suitable hook formed of one or more sharpened tines 32. The rod is long enough to pass through a tubular roll, such as that shown in dotted lines in Fig. 2, and still have its hooked end projecting far enough to enable a sausage to be conveniently hooked and drawn from the utensil in which it has been cooked, while the roll is held over the upper part of the rod by the other hand of the operator. A suitable handle 33 is, of course, provided into which the rod is secured.

Figure 5:
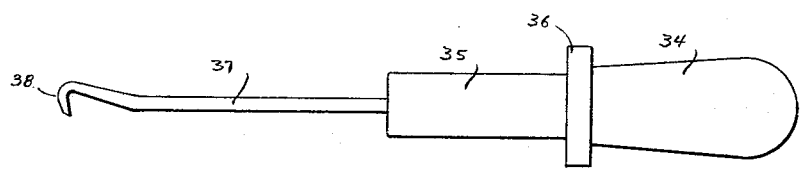
Fig. 5 is a similar view of another simplified form.

In the form of invention shown in Fig. 5, a handle 34 is provided which has at its forward end an extension 35. The extension 35 is preferably of substantially the same diameter as the hole in the tubular roll, and it is of sufficient length to support and hold the tubular roll when placed thereon. This extension terminates at the point where it joins the handle in an annular flange 36 which provides a hilt for the roll as it is drawn over the extension. In this form, a relatively shorter rod 37 is provided which has a suitable hooked outer end 38.

Figure 2:
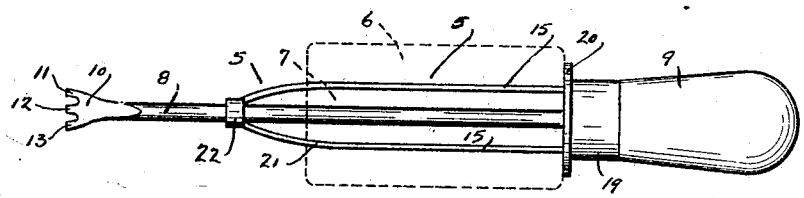
Fig. 2 is a plan view of my implement, showing in dotted lines a farinaceous roll held thereby.
Figure 6:
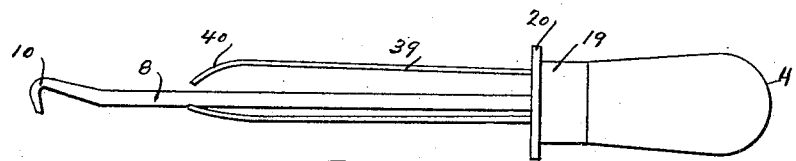
Fig. 6 is a side elevation of a modified form of my invention.

The form of invention shown in Fig. 6 is substantially like that shown in Figs. 1 and 2, in that it has a handle 4 provided with a metallic ferrule 19 having an annular flange 20. A rod 8 is supported by the handle and is provided with a hooked end portion 10. This implement is provided with a plurality of holding wires 39, which may be held in the handle 4 by any suitable means but preferably as shown in Fig. 1. The outer ends 40 of the holding wires are bent inwardly toward the axis of the rod 8 so that the implement may be centered with respect to the roll and passed into the hole thereof without becoming caught in the material of the roll. The wires 39 are bent outwardly a slight degree so that they will be compressed and, therefore, more securely hold the roll in place when engaged therewith. The ends 40 of the wires are spaced from the rod 8 a suitable distance so as to permit ample movement of the rods toward each other without their ends striking and being hindered by engagement with the rod 8.

Figure 7:
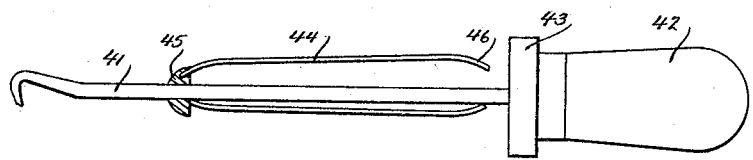
Fig. 7 is a similar view, partly in section of another modification of my invention.

In the form of invention shown in Fig. 7, a rod 41 is carried by the handle 42. The handle is preferably provided with an annular flange 43 which is considerably larger than the hole in the roll and, therefore, provides a stop for the roll. A plurality of holding wires 44 are provided. These wires are attached to and carried by a flange 45, which is secured to the rod 41 near the forward end thereof. The rods are extended rearwardly and have their free ends disposed immediately in front of the flange 43. The flange 45 is, of course, considerably smaller than the hole in the roll so that the roll may be freely passed over it and the wires 44 are so formed that they will yieldably engage the roll when it is slipped over them. The inner ends 46 of the wires are preferably bent inwardly toward the rod 41, whereby they will not become caught in the roll as it is being removed from the implement.

Figure 8:
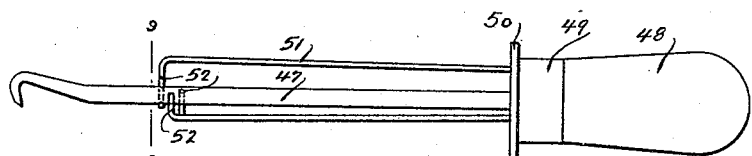
Fig. 8 is a side elevation of still another modification.
Figure 9:
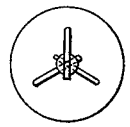
Fig. 9 is a sectional view of the form of Fig. 8 and is taken on line 9—9 of that figure.

In Figs. 8 and 9, I have shown a device comprising a rod 47 having a handle 48, provided with a metal ferrule 49 having a flange 50. A plurality of holding wires 51 are provided in this form of the device and each is rigidly carried at its inner end by the handle 48. The outer end 52 of each of the wires 51 is preferably bent at right angles to the axis of the wire, and is in engagement with a diametrically arranged hole 53 formed in the rod 47 and extending entirely therethrough. Each of the ends 52 has, of course, a separate hole 53 with which it engages.

From the foregoing it will be obvious that by means of the form of my device shown in Figs. 1 to 3, a sausage can be turned over or otherwise manipulated in the cooking utensil by the use of my implement when grasped in one hand. When the sausage is cooked and ready to be served, a tubular roll is passed over the rod 8 and holding wires 15 and is preferably drawn up to the annular flange 20, whereby it will be temporarily held by the implement. The inwardly turned forward ends of the wires facilitate the engagement of the wires with the hole of the roll. The flexibility of the holding wires will temporarily hold the roll in place irrespective of irregularities of diameter or shape of the hole formed therethrough.

When the tubular roll has been placed upon the implement, the hooked end 10 of the rod 8 is then directed by the operator into the cooking utensil containing the food products, and the tines 11, 12 and 13 placed over a sausage close to the end thereof and driven into the same. Since the two outer tines 11 and 13 come in contact with the sausage before the middle tine 11 does, owing to the greater length of the outer tines, there will be a tendency to center the sausage under the rod 8 so that when the tines are finally pressed into the sausage, it will be held with its center line approximately coincident with the axis of the implement. When the sausage is thus hooked the tubular roll 6 is seized by the free hand of the operator, and the implement drawn out of the roll, whereby the sausage will be pulled into the hole 7 thereof. Obviously, the sausage is drawn through the roll until its hooked end appears at the end of the roll nearest the handle, whereupon the implement is unhooked and the filled roll is ready to be served.

It is obvious that the interior of the roll or the exterior of the sausage may be coated, if desired, with mustard or other condiment before being drawn into the roll. If the sausage is to be dipped into condiment, this can be done after it has been hooked by the tines 11, 12, and 13 and without having to touch it with the hands, one hand of the operator being free to open and close the condiment container or for other purposes. If the condiment is placed within the roll before it is placed upon the implement, very little of it will be removed by the holding wires 15.

The operation of each of the forms of my invention shown in Figs. 4 to 9, inclusive, is substantially the same as the form just above described except the form shown in Fig. 4 where both hands of the operator must be employed in the use of the implement. The roll is first slipped over the rod 30 and held about the upper end thereof by the hand of the operator, while with the other hand the operator places the hook in the cooking utensil and engages it with a sausage. The roll is then moved away from the handle 33 by pulling the handle with the rod 30 and the attached sausage away from the roll. In the form of device shown in Fig. 5, the diameter of the extension 35 is such that it will snugly engage the roll so as to temporarily hold it in place while the implement is being used.

My implement is of such a nature that if desired each tubular roll may be covered by a paper bag to prevent soiling or contamination when handling and if so protected it is obvious that the bottom of such bag can be punctured so as to permit the entrance of my implement in the roll and the sausage pulled into it as hereinbefore described. The paper bag can be stripped from the filled roll as it is eaten. Both the roll and the hands of the person eating it will thereby be protected from being soiled.

It is obvious that while I have shown a hook with three tines, a hook with a single tine may be used. However, in view of the slippery nature of the sausage, a hook with more than one tine is preferable.

This and other modifications of the details herein shown and described may be made without departing from the spirit of my invention or the scope of the appended claims, and I do not wish therefore to be limited to the exact embodiment herein shown and described.

Having thus described my invention, what I claim is:

1. An implement for placing food products within a tubular farinaceous roll, comprising a handle, a rod carried by the handle, a hook carried at the outer end of the rod, and means carried by the implement for temporarily holding a tubular roll thereupon.

2. An implement for placing food products within a tubular farinaceous roll, comprising a handle, a rod carried by the handle, a hook carried at the outer end of the rod, and a plurality of holding wires carried by the implement for engaging and yieldably holding the tubular roll while the implement is being used.

3. An implement for placing food products within a tubular farinaceous roll, comprising a handle, a rod carried by the handle, a hook carried at the outer end of the rod, and a plurality of resilient holding wires carried by the handle, each wire having its forward end bent inwardly.

4. An implement for placing food products within tubular farinaceous roll, comprising a handle, a rod carried by the handle, a hook carried at the outer end of the rod, a plurality of resilient holding wires carried by the handle and having their forward ends bent inwardly, and a ring carried by the rod for engagement with the forward inwardly bent ends of the wires.

5. An implement for placing food products within a tubular farinaceous roll, comprising a handle, a rod carried by the handle, a hook carried at the outer end of the rod, the handle being formed with a plurality of longitudinal slots and registering radial holes, and a plurality of holding wires, each having its inner end portion bent at a right angle for engagement with the slots and holes of the handle.

6. An implement for placing food products within a tubular farinaceous roll, comprising a handle, a rod carried by the handle, a hook carried at the outer end of the rod, a plurality of resilient holding wires carried by the handle, each having its forward end bent inwardly toward the axis of the implement, and a ferrule carried by the handle and provided with a laterally exending flange.

7. An implement for placing food products within a tubular farinaceous roll, comprising a handle, a rod carried by the handle, a hook carried at the outer end of the rod, the hook being provided with three tines, and a plurality of holding wires carried by the implement for engaging and yieldably holding the tubular roll while the implement is being used.

8. An implement for placing food products within a tubular farinaceous roll, comprising a handle, a rod carried by the handle, a hook carried at the outer end of the rod, the hook being formed with two relatively long outer tines, and a relatively short center tine, and a plurality of holding wires carried by the implement for engaging and yieldably holding the tubular roll while the implement is being used.

In testimony whereof, I have hereunto signed my name.

CHARLES C. EGBERT.